United States Patent [19]

Brown et al.

[11] 3,787,158

[45] Jan. 22, 1974

[54] TWIN SHEET THERMOFORMER

[75] Inventors: Gaylord W. Brown; George L. Pickard, both of Beaverton, Mich.

[73] Assignee: Koehring Company, Milwaukee, Wis.

[22] Filed: July 3, 1972

[21] Appl. No.: 268,883

[52] U.S. Cl. ................. 425/156, 425/109, 425/388, 425/397, 425/451, 425/DIG. 48
[51] Int. Cl. .......................... B29c 17/04, B29c 3/06
[58] Field of Search ... 425/384, 388, 397, 451, 413, 425/437, 156, 813, DIG. 48, 109

[56] References Cited
UNITED STATES PATENTS

| | | | |
|---|---|---|---|
| 1,310,439 | 7/1919 | Roberts | 425/813 |
| 3,186,034 | 6/1965 | Taylor, Jr. | 425/143 |
| 3,025,566 | 3/1962 | Kostur | 425/388 |
| 3,398,434 | 8/1968 | Alesi, Jr. et al. | 425/109 |
| 3,412,430 | 11/1968 | Zwiebel | 425/168 |
| 3,537,138 | 11/1970 | Brown et al. | 425/388 |
| 3,597,799 | 8/1971 | Earle | 425/388 X |

*Primary Examiner*—Robert L. Spicer, Jr.
*Attorney, Agent, or Firm*—Learman & McCulloch

[57] ABSTRACT

Thermoforming apparatus having a pair of plastic sheet heating stations, each including upper and lower heaters, on opposite sides of a differential pressure forming station, upper and lower plastic sheet supporting carriages for supporting upper and lower pairs of plastic sheets of differing thicknesses; transfer apparatus for shuttling the upper carriages to alternate ones of the heating stations while concurrently moving alternate ones of the lower sheets to opposite ones of the heating stations so that two of the upper and lower sheets are simultaneously heated, one in each heating station, while the other two upper and lower sheets are concurrently superposed at the forming station where they are formed into a hollow article by differential pressure forming apparatus at the forming station, and control apparatus for alternately operating the upper and lower heaters at each heating station for longer and shorter periods of time while the upper and lower heaters at the other station are being operated for shorter and longer periods of time respectively to subject the plastic sheets which are alternately moved to the heating stations to different amounts of heat.

8 Claims, 5 Drawing Figures

FIG.1

TWIN SHEET THERMOFORMER

BACKGROUND OF THE INVENTION

This invention relates to thermoforming apparatus for forming a hollow article in a pair of upper and lower deformable plastic sheets of differing thicknesses and more particularly to thermoforming apparatus including a control system for controlling the duration of heating such plastic sheets in which the article is formed.

Hollow articles may be formed in sheets of differing thicknesses disposed at different vertical levels which are heated at laterally spaced apart heating stations to their forming temperatures before being moved into superposed relation at a central forming station where parts of the article are formed in the sheets and fused to form the article. The thicker sheets must be subjected to heat from a given heating source for a longer duration than the thinner sheets. If the thinner sheets are subjected to the same heat as the thicker sheets, the thinner sheets will lose their strength and excessively sag. Accordingly, it is an object of the present invention to provide thermoforming apparatus having upper and lower heaters at each of a pair of heating stations on opposite sides of a forming station, and control apparatus for alternately operating the heaters at one of the heating stations for longer and shorter periods of time while concurrently operating the heaters at the other heating station for shorter and longer periods of time, respectively, to heat the thicker and thinner sheets, respectively, to the proper forming temperatures.

The heating stations each include upper and lower heaters for heating opposite sides of the sheets. The sheets alternately positioned at each heating station will always be closer to one heater than to the other heater. Even though the plastic sheets may be of the same thickness, the heaters which are closest to the sheets are operated for a shorter duration than the heaters which are more removed from the sheets. If the sheets S are laminated plastic, one side frequently will require more heat than the other to bring the entire sheet to the proper forming temperature.

To maximize production, it is important that the plastic sheets be shuttled as rapidly as possible between the heating and forming stations, but this must be accomplished without abruptly halting the sheet transfer.

The plastic sheets distend and sag slightly when heated to their forming temperature. If the sheet supporting carriages are abruptly halted during transfer of the sheets between stations, the forward momentum of the sheets will tend to further stretch the sheets and cause undue sagging. If the sheets are stretched beyond a predetermined amount, they lose their support strength. Accordingly, it is an object of the present invention to provide apparatus which will rapidly move pairs of plastic sheets between sheet heating stations and forming stations but which will decelerate movement of the sheets during the final portions of their travel between the stations.

SUMMARY OF THE INVENTION

Thermoforming apparatus including a pair of heating stations on opposite sides of a forming station and carriage means for moving alternate ones of a pair of upper sheets to alternate ones of the heating stations while concurrently moving alternate ones of a pair of lower sheets to opposite ones of the heating stations so that one of the sheets of the upper pair is at one heating station and one of the sheets of the lower pair is at the other heating station while the remaining sheets of the upper and lower pairs of sheets are in superposed relation at the forming station, and control means for alternately heating the sheets moved to each station for differing lengths of time.

Other objects and advantages of the present invention will become apparent to those of ordinary skill in the art as the description thereof proceeds.

The present invention may more readily be understood be reference to the accompanying drawings in which:

FIG. 1 is a partly sectional, side elevational view of thermoforming apparatus including heating stations on opposite sides of a central forming station, part of the apparatus at the forming station being broken away to more clearly illustrate the pair of sheet supporting carriages positioned thereat in superposed relation and part of the side wall of one of the heating stations being broken away to more clearly illustrate the carriage supported thereat;

DESCRIPTION OF THE PREFERRED EMBODIMENT

Figure 3:
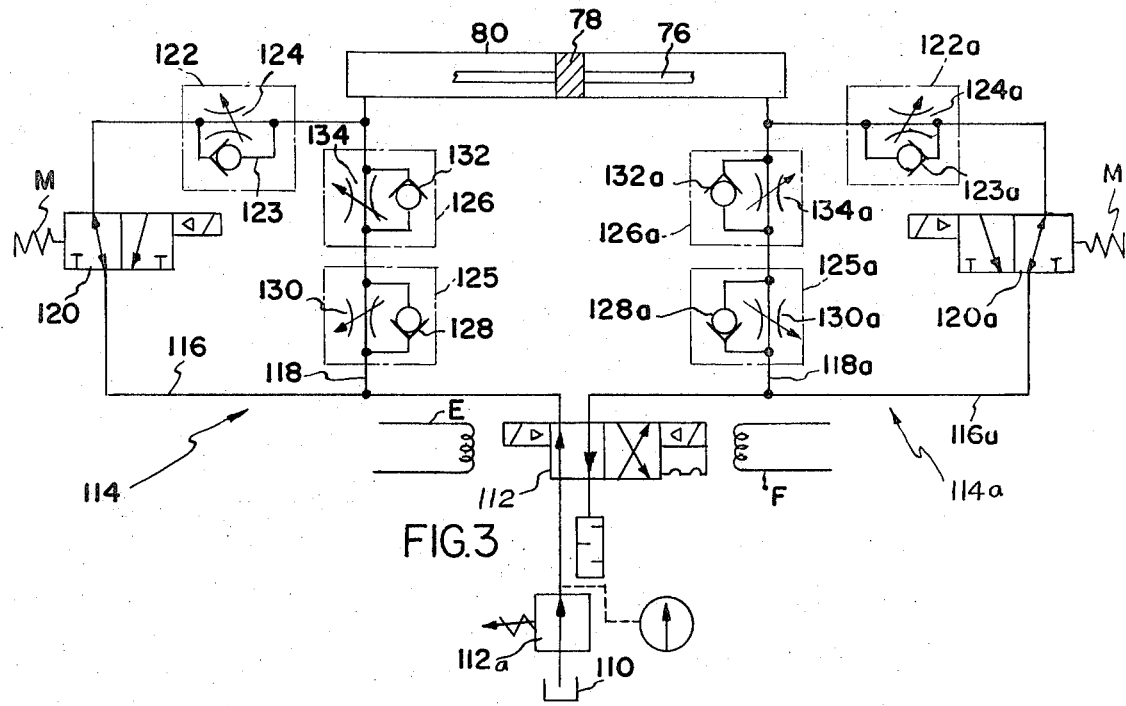
FIG. 3 is a schematic diagram of the fluid control circuit for operating the thermoforming apparatus illustrated in FIGS. 1 and 2.

Apparatus constructed according to the invention is mounted on a support frame $f$ and includes a pair of plastic sheet heating stations, generally designated 12 and 12a, on opposite sides of a central forming station 10, and a sheet advancing assembly, generally designated 13, for moving plastic sheets S between the heating and forming stations. The frame f includes a pair of bottom support wall portions 14 at the heating stations 12 and 12a connected to a central, bottom wall portion 16 by vertical support legs 17 and supporting vertical, end and side rails 18 and 18a spanned by upper and lower rails 20 at each of the heating stations 12 and 12a.

Suspended on pairs of frame suspension members 24 depending from the top rails 20 at the heating station 12 is a quartz lamp heater 22 which may be of the conventional type manufactured by E. L. Weigand Company of New Jersey or General Electric Company. Supported on the lower rails 20 at the heating stations 12 and 12a is an identical quartz lamp heater 28.

The apparatus at the heating station 12a is identical to the heating station 12 and corresponding parts are identified by corresponding reference characters followed by an $a$ subscript.

THE SHEET ADVANCING ASSEMBLY

The sheet advancing assembly 13 includes a pair of upper, plastic sheet supporting carriage members 30 and 32 and a pair of lower plastic sheet supporting carriage members 34 and 36 each including a rectangular frame 38 (FIG. 4) having side caster rollers 40 rotatably received in frame supported horizontal, channel members 42 extending the length of the machine. The hollow rectangular frame 38 includes a plastic sheet receiving opening 37 therein and mounts a plurality of sheet clamping assemblies 44 each including a clamp 46 having a sheet engaging member 48 supported on a clamp arm 47 pivotally mounted on a carriage supported pin 50.

The upper and lower sheet supporting carriage frames 38 are identical except that the dimensions of the openings 37 in the lower frames 38 are less than the dimensions of the openings 37 in the upper frames 38 to permit the unrestricted upward movement of the lower sheets S to the sheets S on the upper carriages during the forming operation, as will be described more fully hereinafter.

Figure 4:
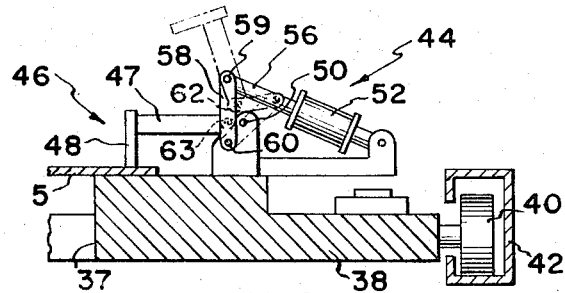
FIG. 4 is a sectional end view, taken along the line 4—4 of FIG. 1, illustrating one of the plastic sheet clamping members.

Apparatus is provided for swinging each clamp 46 between the clamping position, illustrated in solid lines in FIG. 4 and the unclamped position illustrated in chain lines in FIG. 4, and comprises a fluid pressure operated cylinder 52 pivotally mounted on a carriage supported pivot pin 54 and including a piston rod 56 pivotally connected to a pair of laterally spaced links 58 by a pivot pin 59. The links 58 are pivotally mounted on the carriage 38 by pivot pins 60. Depending from the pivot pin 59 is a support link, illustrated in chain lines at 62, pivotally connected by a pin 63 to the clamp arm 47 for moving the clamp arm 47 to the unclamped position, illustrated in chain lines in FIG. 4, when the piston rod 56 of the cylinder 52 is retracted.

The upper sheet supporting carriages 30 and 32 are coupled to each other for concurrent movement of coupling chains 64 and the lower sheet supporting carriages 34 and 36 are coupled together by coupling chains 64a. The upper and lower sheet supporting frames 30 and 34 and the upper and lower frames 32 and 36 are coupled together by link chains 66 trained around sprocket wheels 68 fixed to shafts 67 journaled at opposite ends of the frame f.

Figure 1:
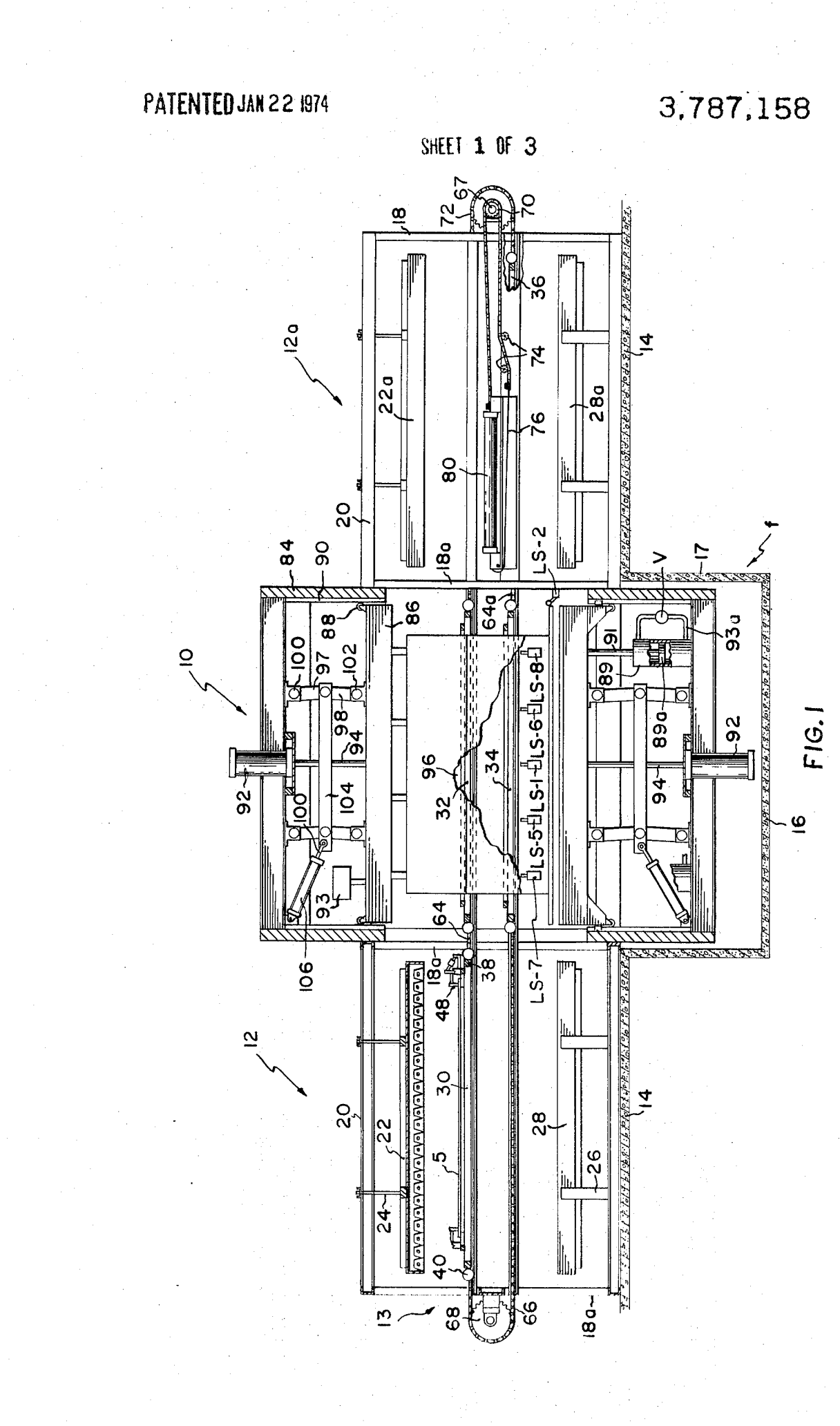

A drive sprocket 70 is mounted on one of the shafts 67 and a drive chain member 72, traveling over frame supported idler sprocket wheels 74 is trained therearound. Coupling members 75 (FIG. 2) couple opposite ends of the chain 72 to cables 76 connected to opposite ends of a piston 78 slidingly disposed within a fluid operated cylinder 80 supported on the frame f. A fluid control system, illustrated in FIGS. 2 and 3, and to be described hereinafter, is provided for longitudinally moving the piston 78 in the cylinder 80 to drive the chains 72 so as to move the carriages 30 and 32 from the positions illustrated in FIG. 1 to positions in which the carriage 30 is at the forming station 10 and the carriage 32 is at the heating station 12a while concurrently moving the sheet supporting carriage 36 to the forming station 10 and the carriage 34 to the heating station 12.

THE MOLD OPERATING MECHANISM

The central forming station 10, disposed between the heating stations 12 and 12a, includes forming apparatus mounted on vertically spaced top and bottom mounting rails 82 spanning vertical support plates 84 which are supported by the vertical side frame rails 18a.

Mounted on the top and bottom rails 82 for vertical movement between this adjacent molding positions, illustrated in FIG. 1, and vertically spaced positions are upper and lower mold supporting platens 86 mounting guide rollers 88 which ride on guides 90 fixed to the vertical support plates 84. The mold supporting platens are vertically reciprocated by fluid pressure actuated cylinders 92 supported on the top and bottom rails 82, including piston rods 94 fixed to the platens 86. The platens 86 support upper and lower differential pressure molds 96 including confronting mold cavities (not shown) in which upper and lower container half sections are formed and fused together at their edges when the molds 96 are moved together, as will be described more particularly hereinafter. The cylinders 92 are firstly operated to move the molds 96 into engagement with the upper and lower heated plastic sheets S at the forming station 10. Vacuum from a vacuum source 93 is then communicated to the molds and the top and bottom container halves are formed to the shape of the mold cavities. The stroke of the upper cylinder 92 is such that the upper mold 96 engages the upper sheet S when the piston rod 94 is at the end of its travel. The piston rod 94 and stroke of the lower cylinder 92 is longer than the piston rod 94 and stroke of the upper cylinder 92 so that the lower mold 96 can be moved upwardly through the opening 37 in the lower frame 38 to move the lower sheet, which is first of all released by the clamps 46, upwardly and press the complementary edges of the mold sections 96 together.

Apparatus is provided for removably locking the molds 96 in the adjacent molding positions illustrated in FIG. 1 in engagement with opposite sides of the upper and lower sheets S to fuse the sheets S together and comprises pairs of pivotally connected toggle links 97 and 98 which are pivotally connected, by pins 100 and 102, to the upper and lower frame rails 82 and the upper and lower mold supporting platens 86. A connecting bar 104 is coupled to the toggle links 97 and 98 for concurrently moving the toggle links 97 and 98 to and from substantially dead center positions when a frame supported, solenoid actuated, double acting, fluid pressure operated cylinder 106, having a piston rod 108 connected with the bar 104, is actuated. Such toggle apparatus is more particularly described in applicant's reissue U.S. Pat. No. RE27,137, granted June 8, 1971, which is incorporated herein by reference.

Hydraulically operated platen locking or stop cylinders 89 are provided on the lower rails 82 and include piston rods 91 connected to the lower platen 86 for positively, temporarily interrupting upward movement of the mold 96 after the upper and lower molds are moved into engagement with the upper and lower sheets S. The piston rods 91 are connected to pistons 89a slidably received in cylinders 89. A fluid circuit line 93a connects the opposite ends of the cylinders 89 to permit the free flow of hydraulic fluid therebetween. A solenoid operated valve V is connected in the line 93a to selectively positively interrupt the flow of fluid through the lines 93a. When the upper and lower molds 96 engage the sheets S, a limit switch LS-2, mounted on the frame plate 18 is actuated to energize a solenoid AH (line L10, FIG. 5) to operate the valve V and block the flow of hydraulic fluid in lines 93a to positively interrupt movement of the lower platen 86. The cylinders 89 will override the force of the lower mold actuating cylinder 92 tending to move the lower mold 96 and will positively halt the upward movement of the lower mold. After a short delay time, the solenoid AH (line L10) is deenergized and the lower mold is permitted to continue its upward movement toward the upper mold 96.

FLUID CONTROL CIRCUIT

Figure 2:
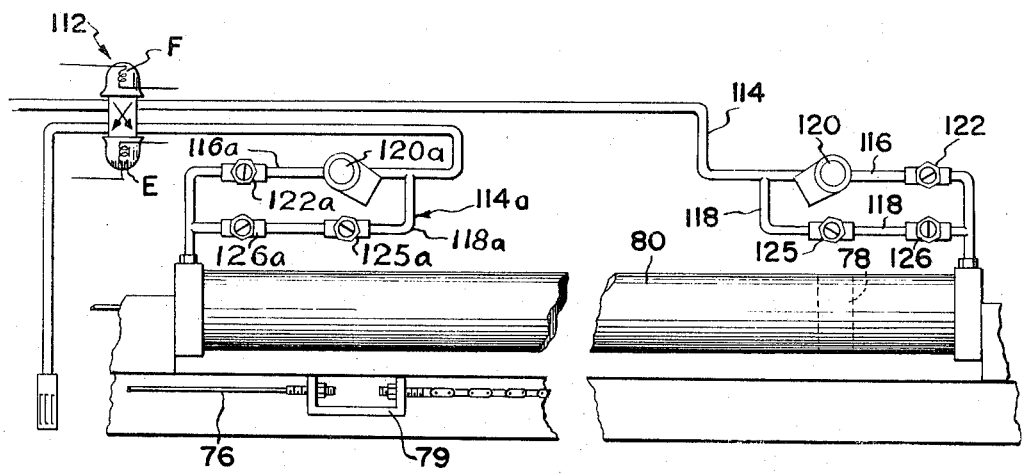
FIG. 2 is an enlarged side elevational view of the indexing apparatus.

Referring now more particularly to FIGS. 2 and 3, air is provided from a reservoir source 110 which atypically supplies air at 80 psi, to a solenoid actuated, 2-position, 4-way valve 112, such as MAC valve, Type 323B-1. The output of the valve 112 is connected to a pair of parallel circuits, generally designated 114 and 114a communicating with opposite ends of the carriage indexing cylinder 80. The parallel circuit 114 includes parallel lines 116 and 118. Connected in series in line 116 is a solenoid actuated 2-way, 2-position deceleration valve 120, selectively movable to "flow-through" and fluid blocking positions, and a variable flow check valve assembly 122 which includes a check valve 123, permitting the free flow of operating air to the carriage indexing cylinder 80, and a parallelly connected variable orifice valve 124 which can adjust the flow of air therethrough.

Connected in series in line 118 are a pair of variable flow check valve assemblies 125 and 126 including oppositely poled check valves 128 and 132, respectively, connected in parallel with the check valves 128 and 132 respectively. The valve assembly 125 permits the free flow of air to the cylinder 80 while restricting the outward flow of air whereas the valve assembly 126 permits air to flow out of the cylinder 80 but restricts the flow of air to the cylinder 80. The circuit 114a is identical to the circuit 114 and identical components will be identified with identical reference characters followed by an *a* subscript.

The directional control valve 112 includes solenoids E and F which are operative, when energized, to move the valve spool of the valve 112 to the "flow-through" position and "cross-over" positions respectively. The deceleration valves 120 and 120a includes solenoids M which, when energized, move the spring returned valve spools to the fluid blocking positions to force fluid through the fluid restricting fluid lines 118 and 118a respectively.

THE ELECTRICAL CONTROL CIRCUIT

Figure 5:
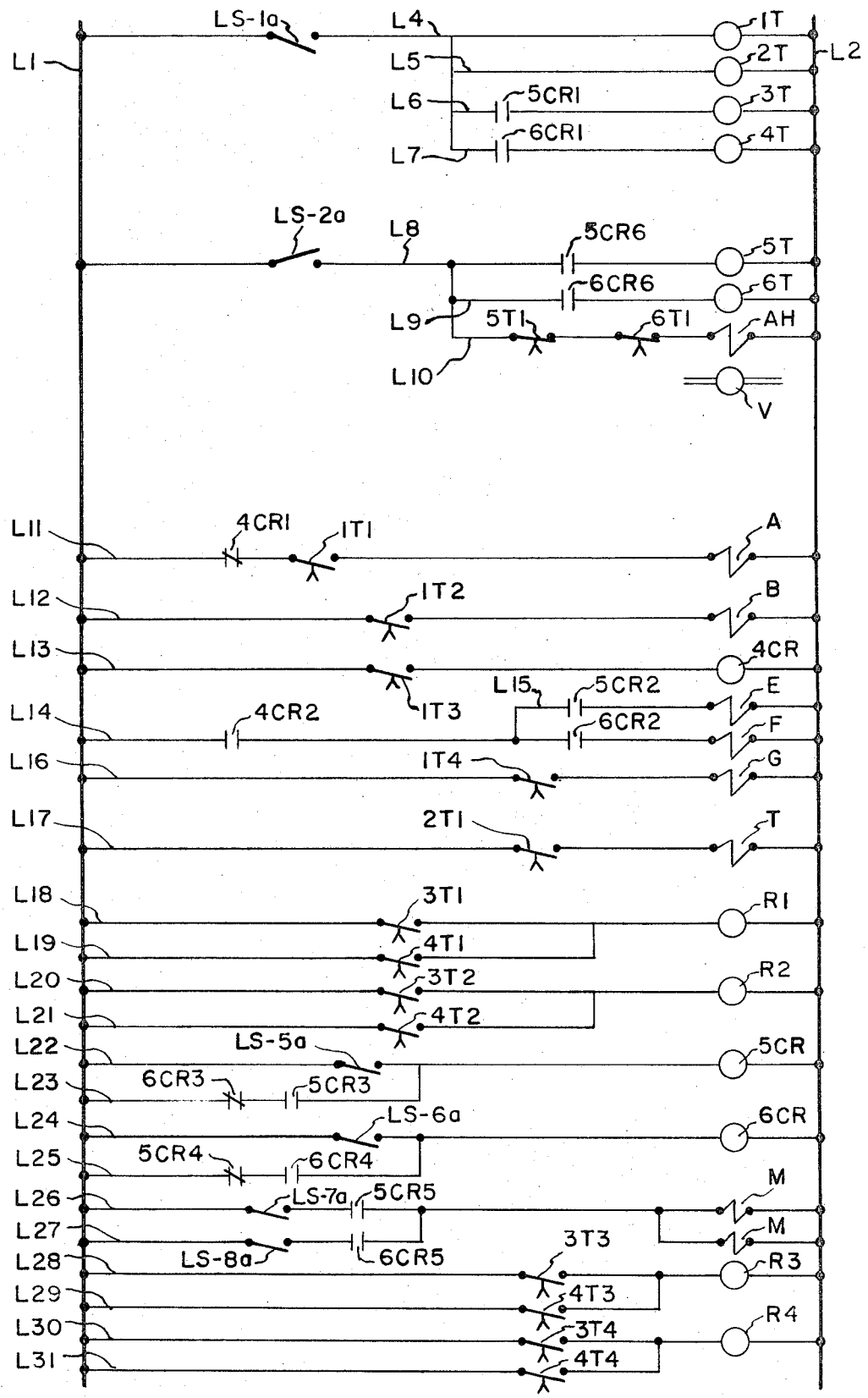
FIG. 5 is a schematic diagram of the electrical control circuit for controlling the apparatus illustrated in FIGS. 1 – 4.

Referring now more particularly to FIG. 5, an electrical control circuit is illustrated for controlling the apparatus illustrated in FIGS. 1 – 4 and includes a pair of main input circuit lines L1 and L2 connected to a source of electrical power such as 110 volts, 60 cycle, alternating current. Connected between the lines L1 and L2 are a plurality of circuit and sub-circuit lines designated L4 - L31 for purposes of convenience. Connected in line L4 across lines L1 and L2 is a set of limit switch contacts LS-1a, of a frame mounted limit switch LS-1, which is actuated when either of the lower sheet supporting carriages 32 or 34 is centrally located at the forming station 10, and a cycle timer 1T including normally open timer contacts 1T1 (line L11), 1T2 (line L12), 1T3 (line L13), and 1T4 (line L16) which sequentially close after the timer 1T is energized. A second air injection and molding control timer 2T (line L5) is connected in parallel with the timer 1T (line L4) and includes a set of timer contacts 2T1 (line L17) which close when the timer times out. Serially connected in line L6 is a heater control timer 3T and the normally open relay control contacts 5CR1, constituting a portion of an index right control relay 5CR (line L22), which close when the relay 5CR (line L22) is energized. Connected in parallel with line L6 is a line L7 including another heater control timer 4T connected in series relation with the normally open contacts 6CR1 constituting part of an index left control relay 6CR (line L24). A limit switch LS-2, mounted on the frame support plates 84 in the path of the lower platen 86, includes a set of normally open contacts LS-2a (line L8) which close when the lower mold 96 is extended into engagement with the lower sheet S at the molding station 10. Serially connected with the limit switch contacts LS-2a are a set of normally open contacts 5CR6, which close when the index right control relay 5CR (line L22) is energized, and a control timer 5T (line L1). The lines L9 and L10 are connected in parallel with the relay contacts 5CR6 and an index right control timer 5T. Serially connected in the line L9 are the normally open contacts 6CR6 which close when the index left control relay 6CR (line L24) is energized and an index left control timer 6T is energized.

Serially connected in line L10 are the normally closed timer contacts 5T1 and 6T1 which open a predetermined time after the timers 5T and 6T respectively are energized, and the solenoid AH for interrupting the flow of fluid from one end of stop cylinder 89 to the other end of the stop cylinder 89. The timers 1T, 2T, 3T, 4T, 5T and 6T are multiple station settable, linear timers of the type manufactured by Eagle Mfg. Co., as Model No. HM5-05-A6-02-06 and include separately energized clutches (not shown) as usual.

Connected between the lines L1 and L2, in line L11, are the normally open timer contacts 1T1, the normally closed relay contacts 4CR1, which are opened with the control relay 4CR (line L3) is energized and a solenoid A for directing air to the platen moving cylinders 92 for moving the upper and lower molds 96 together to the forming positions is energized.

Connected in series in line L12 across line L1 and L2 are the normally open contacts 1T2 and a solenoid B for retracting the molds 96 to their removed positions permitting a part formed therein to be removed and additional sheets S to be clamped to the carriage. Connected in line L13 are the normally open timer contacts 1T3 and a control relay 4CR which includes a set of normally open contacts 4CR2 in line L14 connected in series with a set of normally open contacts 6CR2, which are closed when the relay 6CR (line L23) is energized, and the solenoid F which when energized actuates the directional control valve 112 to the cross-over position to index the carriages 30, 32, 34 and 36 to the positions illustrated in FIG. 1. Connected in line L15 in parallel with the contacts 6CR2 and the solenoid F are the normally open contacts 5CR2, which are closed when the index right control relay 5CR (line L22) is energized, and the solenoid E which when energized actuates the directional control valve 112 to the flow through position, illustrated in FIG. 3, to index the upper carriages 30 and 32 to the right, as viewed in FIG. 1, and concurrently indexes the lower carriages 34 and 36 to the left as viewed in FIG. 1.

Connected in line L16 are the timer contracts 1T4 and the solenoid G for selectively communicating (when energized), the vacuum to the molds 96 when the molds 96 are brought into engagement with the sheets at the forming station 10 to form the upper and lower container halves which are subsequently brought into fusing engagement with each other. Connected in line L17 across lines L1 and L2 are the normally open contacts 2T1, which close a predetermined time after the timer 2T (line L8) is energized, and the ejection air control solenoid I which actuates valves for directing ejection air against the parts in the molds 96 to remove the parts therefrom.

When articles are formed from laminated plastic sheets, i.e., sheets made up of two or more webs of different material, opposite sides of the sheets must be subjected to different amounts of heat to bring the entire sheet to substantially the same forming temperature. The circuitry in lines L18 through L21 comprises the control circuitry for the heaters 22a and 28a at the right hand heating station 12a. connected in line L18 across lines L1 and L2 is a set of timer contacts 3T1 which are closed a predetermined time after the timer 3T (line L9) is energized and a top right heater control relay R1 for energizing the heater 22a at the right hand heating station 12a. Connected in line L19, in parallel with the contacts 3T1, is a set of timer contacts 4T1 which are closed a predetermined time after the timer 4T (line L7) is energized. Connected in line L20 is a set of normally open timer contacts 3T2, which close a predetermined time after the timer contacts 3T1 close, and a bottom right heater control relay R2 which when energized actuates the bottom right hand heater 28a at the right hand heating station 12a a predetermined time after the upper right hand heater 22a is energized. A set of timer contacts 4T2 (line L21), which close a predetermined time after the timer 4T (line L10) is energized but before the timer contacts 4T1 (line L19) close, is connected in parallel with the contacts 3T2 in line L20.

An index right control relay 5CR, for controlling movement of the upper carriages to the right, is connected in line L22 with the normally open limit switch contacts LS-5a which close when the upper carriage 32 is at the forming station 10 as illustrated in FIG. 1. Connected in line L23 in parallel with the switch LS-5a (line L22), are the normally open contacts 5CR3, which close when the relay 5CR (line L22) is energized, and the normally closed contacts 6CR3, which are opened when the index left contact relay 6CR (line L24) is energized. Also connected in line L24 is a limit switch LS-6a which is closed when the frame supported limit switch LS-6 is actuated by the carriage 32 at the forming station 10. The limit switch contacts LS-6a are connected in series with a relay 6CR which, when actuated, closes the normally open contacts 6CR1 (line L7) 6CR2 (line L14), 6CR4 (line L25), 6CR5 (line L27) and 6CR6 (line L4) and the normally closed contacts 6CR3 (line L23). Connected in line L25, in parallel with the limit switch contacts LS-6a, are the normally closed contacts 5CR4, which open when the index right control relay 5CR (line L22) is energized and the normally open contacts 6CR4 which are closed when the index left control relay 6CR in line L24 is energized. Connected in line L26 is a set of normally open limit switch contacts LS-7a, which are closed when the limit switch LS-7 is actuated by the upper sheet supporting carriage 32 approaching the forming station 10 and the normally open contacts 5CR5 which are closed when the index right control relay 5CR (line L22) is energized, and a parallel circuit including a pair of solenoids M which control the positions of deceleration valves 120 and 120a to selectively block the passage of air to and from the cylinder 80 and cause the piston 78 to decelerate the carriages during the final portion of their travel between stations by forcing the air to pass through the circuit paths 118 and 118a.

Connected in line L27, in parallel with the limit switch contacts LS-7a and relay contacts 5CR5, are the normally open limit switch contacts LS-8a and the normally open relay contacts 6CR5 which close when index left control relay 6CR (line L24) is energized. The limit switch LS-8 is actuated to close the contacts LS-8a as the carriage 36 approaches the forming station 10.

The circuitry connected in the lines L28 - L31 comprises control circuitry for the heaters at the left hand heating station 12. Connected in line L28 are the normally open timer contacts 3T3 which close a predetermined time after the timer 3T (line L9) is energized and after the timer contacts 3T1 (line L18) and 3T2 (line L20) close, and a top left heater control relay R3 which, when energized, actuates the upper quartz heaters 22 in the left heating station 12. Connected in parallel with the timer contacts 3T3 are a set of normally open, timer contacts 4T3 (line L29) which close a predetermined time after the timer 4T (line L7) is energized but before the timer contacts 4T2 (line L21). Connected in line L30 is a set of timer contacts 3T4 which close a predetermined time after the timer 3T (line L9) is energized but before the contacts 3T3 (line L28) close, and a bottom left heater control relay R4 which, when energized, energizes the lower left hand heater 28. Connected in parallel with the timer contacts 3T4 are the normally open timer contacts 4T4 which close a predetermined time after the timer 4T (line L10) is energized and a predetermined time after the contacts 4T3 close but before the contacts 4T1 (line L19) close.

The timer 3T thus operates to energize the top right heater 22a before the lower right heater 28a which is energized before the top left heater and energizes the top left heater after the lower left heater is energized when the carriages 30, 32, 34 and 36 are positioned as illustrated in FIG. 1. When the positions of the sheet supporting carriages are reversed, the timer 4T operates to energize the top left heater 22 before the lower left heater 28 which is energized before the top right heater 22a and operates the lower right heater 28a for a longer duration than the top right heater 22a.

THE OPERATION

It is assumed that the platens 86 are initially retracted and that the upper and lower sheet supporting carriages 32 and 34 carry laminated plastic sheets S, which have been preheated to the desired forming temperature at the heating stations 12 and 12a and have just been moved to the positions illustrated in FIG. 1 to actuate the limit switches LS-1, LS-5 and LS-7. the sheets S carried by the top carriages 30 and 32 are thinner than the sheets S carried by the lower carriages 34 and 36. When the limit switch LS-1 is actuated, the contacts LS-1a (line L5) close and the timer 1T (line L7) is energized. A predetermined time after the timer 1T is energized, the timer contacts 1T1 (line L11) close to energize mold advance solenoid A for directing air to the mold advancing cylinders 92 so as to extend the pistons 94 and the toggle links 97 and 98. After the molds 96 are moved into engagement with the upper and lower sheets S on the carriages 32 and 34, the limit switch LS-2 is actuated by the lower platen 86 to close the contacts LS-2a (line L8) and energize the platen locking solenoid AH (line L10) to temporarily halt the lower platen 86 in position. The timer contacts 1T4 (line L16) then close to actuate the vacuum control solenoid G (line L16) to create a vacuum in the molds and form shapes in the upper and lower sheets. After the shapes are formed, air is directed to the clamp control cylinders 52 on the lower sheet supporting carriage 34 so as to swing the clamps 46 to the unclamped position, illustrated in chain lines in FIG. 4, and release the lower sheet S on the carriage 34 so that it can be moved upwardly with the lower mold 96.

When the limit switch LS-5 is actuated, the contacts LS-5a (line L22) close to energize the control relay 5CR (line L22) and close the normally open contacts 5CR6 (line L8) which energizes the timer 5T (line L8) when the lower mold has moved upwardly a sufficient distance to actuate the limit switch LS-2 and close the contacts LS-2a (line L8). After a short delay time, i.e., 5 seconds, the timer contacts 5T1 (line L10) open to deenergize the lower platen locking solenoid AH which operates the lower platen halting valve V to permit the lower platen to continue to be raised upwardly and move the lower sheet S into engagement with the upper sheet S so as to press the upper and lower sheets S together to fuse the shapes into a hollow structure. When the part is formed, the timer contacts 1T1 (line L12) close to move the molds 96 apart so that the formed part can be removed.

Concurrently with the formation of the hollow structure at the forming station 10, the sheets on the upper and lower carriages 30 and 36 are being heated at the heating stations 12 and 12a, respectively. A predetermined time after the relay 5CR (line L22) is energized the contacts 5CR1 (line L9) close to energize the heater control timer 3T. A short time after heater control timer 3T is energized, the timer contacts 3T1 (line L18) close to energize the top right heater control relay R1 for energizing the top heater 22a at the right hand heating station 12a. A predetermined time thereafter, the timer contacts 3T2 (line L20) close to energize the bottom right heater control relay R2 for energizing the bottom right heater 28a. A predetermined time, depending on the thickness of the upper sheet on the carriage 30, after the timer contacts 3T1 close, the timer contacts 3T4 (line L30) close to energize the bottom left heater control relay R4 for energizing the lower heater at the left heating station 12 to apply heat to the bottom side of the sheet S on the carriage 30 for a lesser time than heat is applied to the upper side of the sheet S at heating station 12a. A predetermined time after the timer contacts 3T4 close and after the contacts 3T2 (line L20) close the timer contacts 3T3 (line L28) close to energize the top left heater control relay R3 which energizes the top left heater 22. When the carriages 30, 32, 34 and 36 are in the positions illustrated in the drawing, the heater 22a will be operated for a longer period of time than any of the remaining heaters 28a, 22, or 28 and the heater 22 will be operated for a shorter time than any of the heaters 28, 22a and 28a. After a predetermined time, the timer 3T times out and resets to simultaneously deenergize the heater control relays R1-R4 and the heaters 22, 22a, 28 and 28a at both heating stations. After the relays R1-R4 are deenergized, the contacts 1T3 (line L13) close to energize the relay 4CR which opens the contacts 4CR1 (line L11) to deenergize the mold advance solenoid A and the contacts 1T2 (line L12) close to energize the mold retract solenoid B for retracting the molds 96 to their removed positions. When the molds 96 spread, the clamps 46 on the upper carriage 32 are released and the contacts 2T1 (line L17) close to energize the air eject solenoid I for directing ejection air into the molds 96 to eject the parts therefrom, which may be manually removed to a remote location.

After the molds 96 have moved to spread positions, the timer contacts 1T3 (line L13) close to energize the carriage indexing control relay 4CR which closes a set of contacts 4CR2 (line L14) to energize the carriage advance solenoid E (line L15) through the contacts 5CR2 (line L15) which close when the relay 5CR (line L22) is energized by the closure of limit switch contacts LS-5a as the carriage 32 reached the forming station. When the solenoid E is energized, the fluid directional control valve 112 (FIG. 3) is moved to the cross-over position to direct fluid through the fluid line 116a (FIG. 30) and the check valve 123a to the opposite end of the carriage indexing cylinder 78. Fluid from the other end of the cylinder 80 passes freely through the variable orifice 124 of the valve 120 and the lines 116 to the reservoir. The carriage indexing piston 78 moves toward the right to drive the chains 76 which turns the sprocket wheels 67 and 68 to drive the carriage driving chains 66 and move the upper carriages 30 and 32 to the right and the lower carriages 34 and 36 to the left until the upper carriage 30 and lower carriage 36 are in superposed relation at the forming station 10.

During the initial portion of the travel from the position illustrated in FIG. 1 to the position in which the carriage 30 is at the forming station 10, the fluid flows freely to and from the cylinder A through lines 116a and 116. When the cylinder approaches the end of its path, the limit switch LS-8 is energized to close the contacts LS-8a in line L27. The limit switch LS-6 is also in the path of the carriage 36 and is actuated as the carriage 36 reaches the forming station 10 to close the contacts LS-6a (line L25) to energize the relay 6CR (line L24) and close the contacts 6CR5 (line L27) to energize the fluid control valve solenoid M (line L26) which moves the valves 120 and 120a to the blocking positions to prevent fluid from flowing through the lines 116 and 116a and force the fluid through the lines 118 and 118a. The fluid through the lines 118 and 118a is restricted to decelerate the pistons 78 during the final portions of their strokes. The lower carriage 36 arriving at the forming station 1 will energize the limit switch LS-1 and the limit switches LS-6.

When the limit switch LS-1 is energized, the limit switch contacts LS-1a (line L5) again close to operate timers 1T and 2T as described hereinbefore. When the limit switch LS-6 is actuated, contacts LS-6a (line L23) close to energize the index left control relay 6CR which closes the contacts 6CR1 in line L10 to energize the heater control timer 4T. Energization of the timers 1T and 2T operates the upper and lower molds 96 and 98 to form another part in the sheets as described hereinbefore. A predetermined time after the timer 4T is energized, the timer contacts 4T3 and 4T4 (line L29 and L31) successively close to successively energize the top and bottom heater control relays R3 and R4 which successively operate the left hand heaters 22 and 28. A predetermined time after the actuation of the timer contacts 4T3 close, the contacts 4T2 and 4T1 (lines L21 and L19) successively close to successively energize the right hand heater control relays R1 and R2 which successively energize the heater control relays 22a and 28a. In this instance, the heaters 22a and 28a need not be operated as long as the heaters 22 and 28 are operated since a thinner sheet is at the station 12a. The heater 22 will be operated for a longer period of time than any of the remaining heaters 28, 22a and 28a are operated, and the heater 22a will be operated for a shorter period of time than the heaters 28a, 22 and 28 are operated. When the timer controls 1T2 and 1T3 (lines L12 and L13) close, the molds are again retracted and the operation is repeated.

It is to be understood that the drawings and descriptive matter are in all cases to be interpreted as merely illustrative of the principles of the invention rather than as limiting the same in any way since it is contemplated that various changes may be made in the various elements to achieve like results without departing from the spirit of the invention or the scope of the appended claims.

I claim:

1. Apparatus for forming a hollow object in sheets of deformable thermoplastic material comprising:
   a central forming station;
   a pair of sheet heating stations on opposite sides of said central forming station at which sheets of deformable thermoplastic material are heated;
   upper and lower carriage means for supporting upper and lower pairs of said sheets of thermoplastic material;
   means mounting said upper and lower carriage means for movement between said sheet heating and forming stations;
   means for concurrently moving said upper and lower sheet supporting carriage means in opposite directions to move said lower sheet supporting means in a to-and-fro path between a first position in which one of said lower sheets is at one of said heating stations and the other of said lower sheets is at said forming station and a second position in which said other lower sheet is at the other heating station and said one sheet is at said forming station and to concurrently move said upper sheet supporting means in an opposite to-and-fro path between a first position in which one of said upper sheets is at said other heating station and the other of said upper sheet is at said forming station superposed with said other lower sheet and a second position in which said other of said upper sheets is at said one heating station and said one upper sheet is at said forming station superposed with said one lower sheet;
   upper and lower molding means including differential pressure applying means at said forming station movable toward and away from each other between removed positions and adjacent positions for forming a shape in at least one of the upper and lower superposed sheets and fusing the sheets together;
   energizable and deenergizable upper and lower sheet heating means at each of said heating stations; and
   means for selectively, individually operating each of said heating means at each station including control means for operating one of the heating means at one station for a longer time than any of the other heating means are operated and for operating one of the heating means at the other heating station for a shorter time than any of the other heating means are operated when said upper and lower sheet supporting means are in said first positions and for
   operating said one heating means at said one station for a shorter time than any of the other heating means and for operating said one heating means at the other heating station for a longer time than any of the other heating means when said upper and lower sheet supporting means are in said second positions.

2. The apparatus of claim 1 wherein said operating means comprises timer means for initiating operation of the one heating means at said one station a predetermined time before operation of the other heating means at said one station is initiated when said sheet supporting means are in said first positions; and additional timing means for initiating operation of said one heating means at said other station a predetermined time after operation of the other heating means at said one station is initiated when said sheet supporting means are in said first positions.

3. Apparatus for forming a hollow object from sheets of deformable thermoplastic material comprising:
   a central forming station;
   a pair of sheet heating stations on opposite sides of said central forming station for heating said sheets of thermoplastic material;
   upper and lower carriage means for supporting upper and lower pairs of said sheets of thermoplastic material;
   means for concurrently moving said upper and lower sheet supporting carriage means in opposite directions to
      move said lower sheet supporting means in a to-and-fro path between a first position in which one of said lower sheets is at one of said heating stations and the other of said lower sheets is at said forming station and a second position in which said other lower sheet is at the other heating station and said one lower sheet is at said forming station and to
      concurrently move said upper sheet supporting means in an opposite to-and-fro path between a first position in which one of said upper sheets is at said other heating station and the other of said upper sheets is at said forming station superposed with said other lower sheet and a second position in which said other of said upper sheets is at said one heating station and said one upper sheet is at said forming station superposed with said one lower sheet;
   upper and lower molding means including differential pressure applying means at said forming station movable toward and away from each other between removed positions and adjacent positions for forming a shape in at least one of the upper and lower superposed sheets and fusing the upper and lower superposed sheets together to form a hollow article; and
   heating means at each of said heating stations;
   said moving means including means for converting linear motion to rotary motion including;

fluid responsive reciprocal means alternately movable in a to-and-fro path of travel between a first position in which said upper and lower sheet supporting means are in said first positions and a second position in which said upper and lower sheet supporting means are in said second positions; and fluid control means for directing fluid to said reciprocal means to move said reciprocal means between said first and second positions including means for moving said reciprocal means at a first predetermined speed during the initial portion of its travel from one of said first and second positions to the other and for moving said reciprocal means at a lesser predetermined speed during the final portion of its travel from said one to said other position.

4. The apparatus set forth in claim 3 wherein said fluid control means includes variable flow valve means connected in fluid circuit relation with said reciprocal means, means in parallel with said variable flow means for permitting said fluid to flow freely to and from said reciprocal means during said initial portion of travel and for interrupting said flow of fluid in said parallel path to force said fluid through said variable flow valve means to restrict the flow of fluid to and from said reciprocal means during said final portion of said travel.

5. The apparatus of claim 3 wherein said moving means comprise a fluid operated cylinder having a reciprocable piston comprising said reciprocable means, said fluid control means includes a pair of fluid circuits for coupling a source of fluid to opposite ends of said cylinder, each of said circuits comprises a first circuit line including a valve operable in a first position to permit the free flow of fluid to and from said cylinder and a second position interrupting the flow of fluid in said first circuit line and a second circuit in parallel with said first circuit including a pair of oppositely poled check valves connected in series and a pair of variable orifice valves in parallel with said check valves permitting limited fluid to pass to and from said cylinder.

6. Apparatus for forming a hollow object in sheets of deformable thermoplastic material comprising:
differential pressure forming apparatus at a forming station;

sheet heating apparatus at a pair of sheet heating stations on opposite sides of said forming apparatus;

upper and lower pairs of sheet supporting carriage means for supporting upper and lower pairs of plastic sheets;

means for moving said carriage means in to-and-fro paths of travel between positions at opposite one of said heating stations and superposed positions at said forming stations;

said forming apparatus comprising upper and lower differential pressure molds movable toward and away from each other between removed positions and adjacent molding position into engagement with said upper and lower sheets to form shapes and fuse the sheets together to form said hollow object;

means for moving said molds between said removed and molding position; and stop means overriding said moving means for temporarily interrrupting the upward movement of the lower mold toward the upper mold after the lower mold engages the lower sheet and before the sheets are fused together.

7. The apparatus of claim 6 wherein said stop means comprises a fluid circuit including a fluid containing vessel having port means therein for permitting the escape of fluid from said vessel, means coupled to said mold and movable in the vessel for displacing fluid through said port means in response to upward movement of said lower mold means and means responsive to said lower mold being moved upwardly into engagement with said lower sheet for temporarily interrupting the flow of fluid through said port means to interrupt upward movement of said displacing means and said lower mold.

8. The apparatus of claim 7 wherein said fluid interrupting means comprises a valve movable between fluid blocking and fluid passing position for selectively interrupting and not interrupting the flow of fluid through said port means, and means operable a predetermined time after said lower mold engages said lower sheet for moving said valve to said fluid passing position permitting fluid to flow through said port means.

* * * * *